United States Patent [19]

Le

[11] Patent Number: 4,971,002

[45] Date of Patent: Nov. 20, 1990

[54] ROTARY INTERNAL COMBUSTION ENGINE

[76] Inventor: Le K. Le, 188 E. Kirkwall Rd., Azusa, Calif. 91702

[21] Appl. No.: 462,903

[22] Filed: Jan. 5, 1990

Related U.S. Application Data

[63] Continuation of Ser. No. 302,392, Jan. 26, 1989, abandoned.

[51] Int. Cl.$^5$ ............................................... F02B 53/08
[52] U.S. Cl. ...................................... 123/238; 418/191
[58] Field of Search ..................... 123/238, 239, 249; 418/191

[56] References Cited

U.S. PATENT DOCUMENTS

| | | | |
|---|---|---|---|
| 871,523 | 11/1907 | Pollock et al. | 123/238 X |
| 1,147,428 | 7/1915 | Peterson | 123/238 X |

FOREIGN PATENT DOCUMENTS

| | | | |
|---|---|---|---|
| 102743 | 12/1937 | Australia | 123/238 |
| 3429867 | 10/1985 | Fed. Rep. of Germany | 123/238 |
| 98401 | 3/1923 | Switzerland | 123/239 |
| 548827 | 10/1942 | United Kingdom | 123/238 |
| 681038 | 10/1952 | United Kingdom | 123/238 |

*Primary Examiner*—Michael Koczo
*Attorney, Agent, or Firm*—Boniard I. Brown

[57] ABSTRACT

An internal combustion engine includes a compressor and an expander of the type having a pair of multilobed, intermeshing rotors rotatably installed in a casing, and a combustion chamber communicating with said compressor and expander through their respective discharge and intake ports. Valve means are disposed at the discharge and intake ports to control fluid flow. The expander is provided with a higher volumetric capacity than that of the compressor to promote a complete expansion of the gases. The compressor delivers successive and separate charges of compressed air-fuel mixture to the combustion chamber. Heat is added at constant volume to said compressed mixture to produce high pressure gases which are thereafter, transferred to the expander to produce mechanical work.

20 Claims, 3 Drawing Sheets

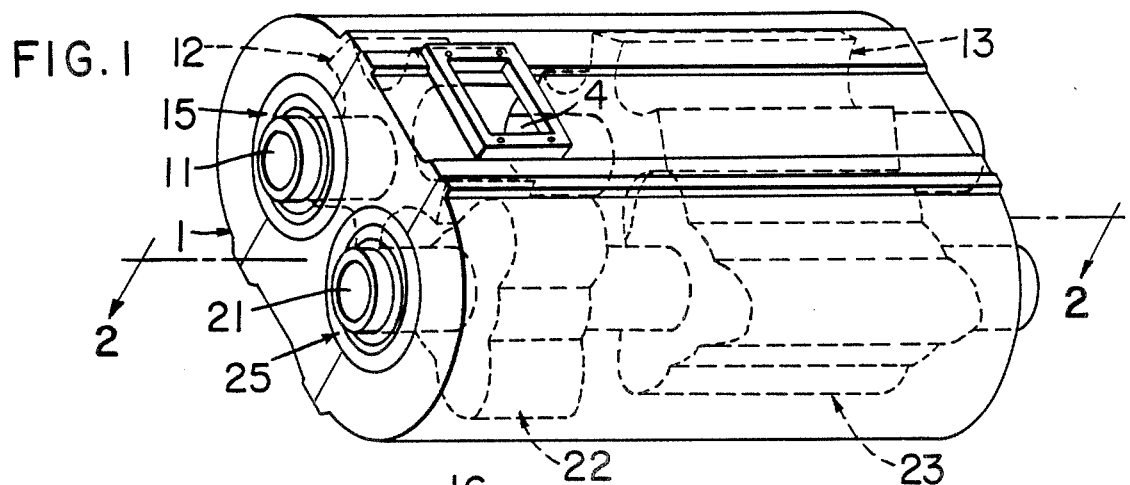
FIG. 1
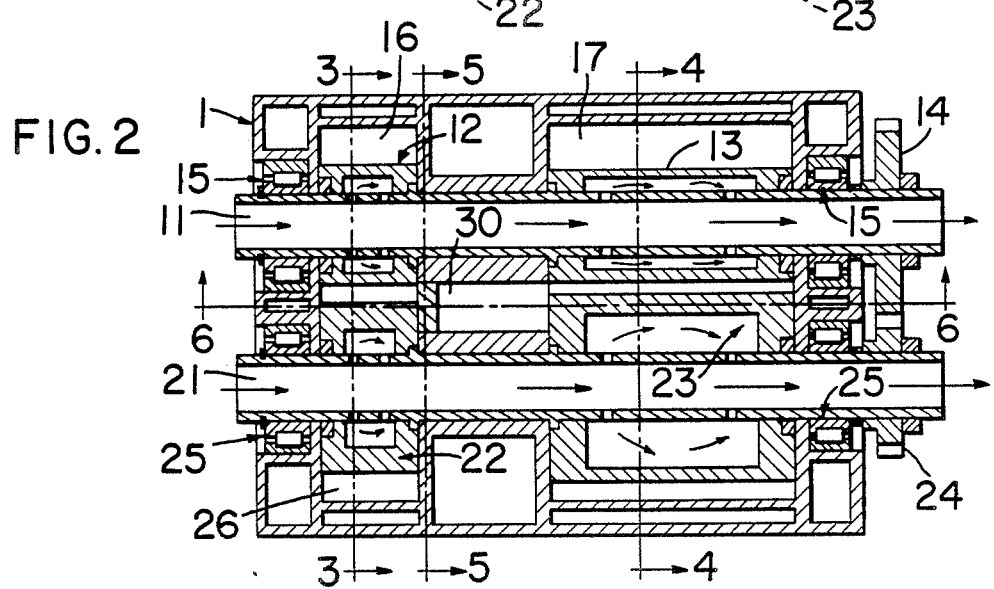
FIG. 2
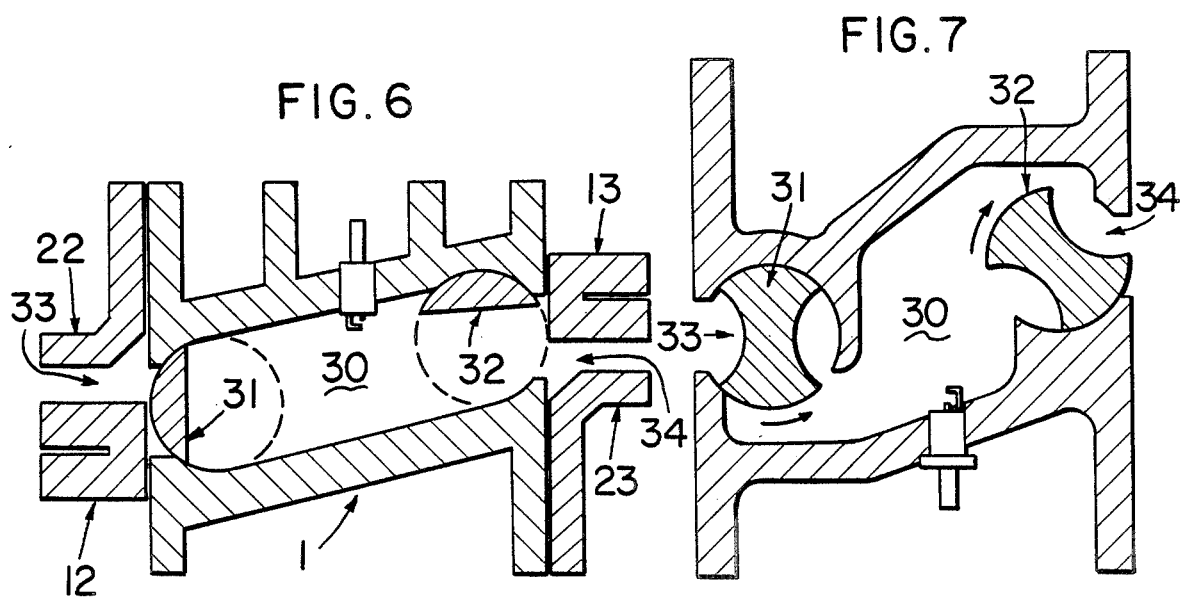
FIG. 6
FIG. 7

ROTARY INTERNAL COMBUSTION ENGINE

This is a continuation of copending application Ser. No. 07/302,392 filed on Jan. 26, 1989, abandoned.

The present invention relates to an internal combustion engine having intermeshing rotors.

Many attempts have been made in the past to produce an engine with rotary components in place of pistons and cylinders. In theory, rotary engines may be made smaller and lighter than reciprocating piston engine of the same power. They may also be built with fewer parts, resulting in reduced manufacturing and maintenance costs.

Known engines with intermeshing rotors may be constructed as continuous combustion engines in which a compressor delivers a continuous flow of compressed air-fuel mixture to a combustion chamber where heat is added at constant pressure to said mixture to produce hot gases with increased volume. The hot gases are then directed to an expander to produce mechanical work. Compressor and expander may be of the Roots or gear type without internal compression, or of the Lysholm or screw type and may comprise single or multiple stages of compression and expansion.

Rotary engines of this type are characterized by low thermal efficiency as is well known of engines operating at low maximum temperature and low compression ratio. They are also bulky and heavy for their power output due to the necessity of compounding compression and expansion stages to obtain an acceptable overall compression ratio.

Examples of this type of engine are disclosed in U.S. Pat. No. 3,724,457 issued 4-3-73 to Kenneth D. Sauder and U.S. Pat. No. 4,012,903 issued 3-22-77 to F. E. Riedl.

In another type of engine with intermeshing rotors, a pair of rotors disposed in a casing generates working chambers which vary in volume to produce compression and expansion of the working fluid. Said working fluid is first compressed to a minimum volume, then ignited and converted to high pressure gases which cause the working chamber to expand and produce mechanical work.

This type of engine does not provide a positive expulsion of the exhaust gases nor a positive suction at the intake phase inherent to the rotation of its rotors, so external scavenging means may be necessary to evacuate burned gases and fill the working chambers with fresh mixture. Other problems of this engine are its elaborate fuel metering system to avoid fuel losses through the scavenging fluid and the difficulty in controlling engine output when running it at less than full power.

Examples of this type of engine are disclosed in U.S. Pat. No. 3,973,527 issued 8-10-76 to Hans R. Nilsson and Roland Pamlin of Sweden and in U.S. Pat. No. 4,003,349 issued 1-18-77 to Leopold v. Habsburg-Lothringen of Germany.

It is an object of the present invention to provide a rotary internal combustion engine which will overcome the foregoing disadvantages of prior art devices.

It is also an object of this invention to provide an engine which will be compact and have few moving parts to reduce manufacturing and maintenance costs.

It is another object of this invention to provide an engine having high thermal efficiency. Increase in thermal efficiency may be obtained by providing the engine with a compression ratio comparable to that of a piston engine, by promoting a complete expansion of the gases in the expander and by providing a liquid cooling of the engine casing and rotors, thereby allowing a safe operation at high maximum temperature.

It is still another object of the present invention to provide a rotary, positive displacement engine having separate compression, heat addition and expansion phases which take place simultaneously in different parts of the engine, and in which heat is added at constant volume giving high maximum pressure for high thermal efficiency.

Other and more specific objects of this invention will appear from a perusal of the following description of the preferred embodiments and the claims, together with the accompanying drawings.

BRIEF DESCRIPTION OF THE DRAWINGS

FIG. 1 is a perspective view of a preferred embodiment of rotary internal combustion engine according to the present invention;

FIG. 2 is a longitudinal sectional view of a preferred embodiment of a rotary internal combustion engine according to the present invention, taken along line 2—2 in FIG. 1;

FIG. 6 is a partial sectional view of the rotary internal combustion engine of FIG. 2, taken along line 6—6 in FIG. 2;

FIG. 7 is a sectional view of alternate form of valve arrangement, according to the invention, wherein continuously rotating valve members are utilized;

DESCRIPTION OF THE PREFERRED EMBODIMENTS

Figure 3:
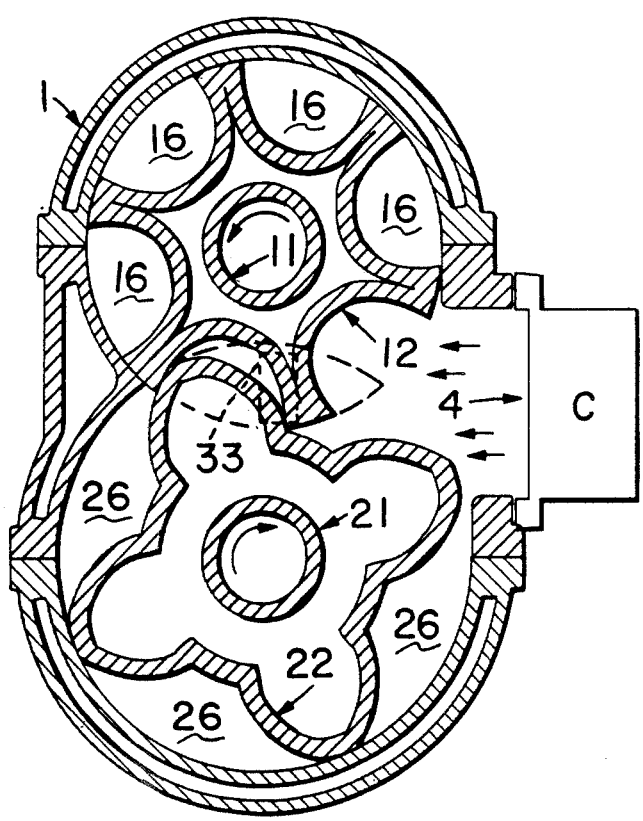
FIG. 3 is a sectional view of the rotary internal combustion engine of FIG. 2, taken along line 3—3 in FIG. 2.

Referring to the drawings, FIGS. 1 to 5 illustrate a preferred embodiment of the rotary internal combustion engine of the present invention, which comprises a rotary compressor and a rotary expander. The rotary compressor includes a casing 1 having a pair of cylindrical, intersecting chambers having parallel axes, an intake port 4 for drawing in air, and a high pressure discharge port 33 in communication with the combustion chamber. Port 33 is located in an end wall of the compressor in a plane passing through the centers of the two chambers. Two multilobed intermeshing first and second rotors 12, 22 are rotatably mounted in the compressor casing. The male rotor 22 has a plurality of lobes which have convex flanks, and the female rotor 12 has a number of grooves or cavities greater than the number of lobes of the male rotor. The groove-forming lobes on rotor 12 have concave flank, as shown.

Compressor rotors 12 and 22 may have straight lobes and grooves, as shown in cross-section in FIG. 2, although alternative rotors with helical lobes and grooves with a wrapping angle of up to 360°, or rotors having a different number of lobes and grooves or lobe profiles than those illustrated in FIG. 3, may also be efficiently utilized. Alternative forms of rotors, with different respective numbers of lobes and grooves or cavities, are shown in FIGS. 8 through 12 which are disclosed for illustrative purposes only, and not in any limiting sense. An important feature of the compressor of the invention is that its compression ratio depends essentially upon the location of its discharge port 33 and the timing of the opening of valve 31. Helical rotors are not necessary to obtain high compression ratios.

The rotary expander (FIGS. 2 and 4) includes a casing 1 which has a pair of intersecting cylindrical chambers having parallel axes. A high pressure intake port 34 is located in an end wall of the expander and is in communication with the combustion chamber. Spent gas passes through exhaust port 7. Port 34 is in approximate axial alignment with port 33 (FIG. 6). Two multilobed, intermeshing third and fourth rotors 13, 23 are rotatably mounted in the expander casing. The male rotor 23 is provided with a number of lobes having convex flanks, and the female rotor 13 has a greater number of grooves or cavities than the number of lobes of the male rotor. The groove-forming lobes on rotor 13 have concave flanks.

The expander and the compressor being similar in structure, the above description relative to the compressor rotors is applicable to the expander rotors.

Preferably, the lobes and the grooves or cavities of the rotors are each asymmetrical, as indicated in such figures as FIGS. 3, 8, 10 and 11.

The expander may be provided with a higher volumetric capacity than that of the compressor to allow for the complete expansion of the gases; as shown in FIG. 2, the expander has a greater axial length than the compressor, and hence has a higher volumetric capacity.

A combustion chamber 30 is disposed between the compressor and the expander. Chamber 30 communicates with the compressor and the expander respectively through the high pressure discharge port 33 and the intake port 34.

Valves 31 and 32 are respectively disposed at the compressor discharge port 33 and the expander intake port 34 to control fluid flow. Each valve may consist of a cylinder segment rotatable about its axis. The valves may rotate continuously as in the embodiment of FIG. 7. Each valve may be driven by suitable means engaging the rotor shafts. In the embodiment of FIG. 6, conventional cam arrangements (not shown) or other means may be utilized to move the respective valve segments in alternating rotational directions between open and closed positions, each being urged to closed position by spring means. FIG. 6 shows valve 31 in its closed position and valve 32 in its open position.

Two synchronizing gears 14 and 24 are rigidly secured to the rotor shafts to maintain the male and female rotors in intermeshing relation.

Ignition means for igniting the compressed air-fuel mixture in the combustion chamber are shown in FIG. 6 in the form of a spark plug. Carburetion means C (FIG. 3) may be located at intake port 4 to meter fuel into the air supplied to the engine.

In the preferred embodiment of the invention shown in FIGS. 1 to 5, the compressor and expander may have equal diameters and may be disposed coaxially in end-to-end relation in a common casing, their abutting ends being separated by a separation wall structure which may enclose the combustion chamber 30 and the valve means 31, 32. The compressor and expander rotors may be rigidly mounted on two common shafts which may extend through the compressor and the expander chambers and may be supported by bearings 15, 25 disposed on the engine end walls. The male compressor and expander rotors 22, 23 may be attached to one shaft 21 and the female rotors 12, 13 to the other shaft 11. The expander rotors 13, 23 have configurations which are similar, and which are the mirror-images of the cross-sections of their compressor counterparts 12, 22, the features or parts thereof being reversely arranged, so that the compressor may generate a succession of decreasing volume chambers and the expander, a succession of expansion chambers while their respective rotors, attached to common shafts, are rotating in the same direction.

Figure 4:
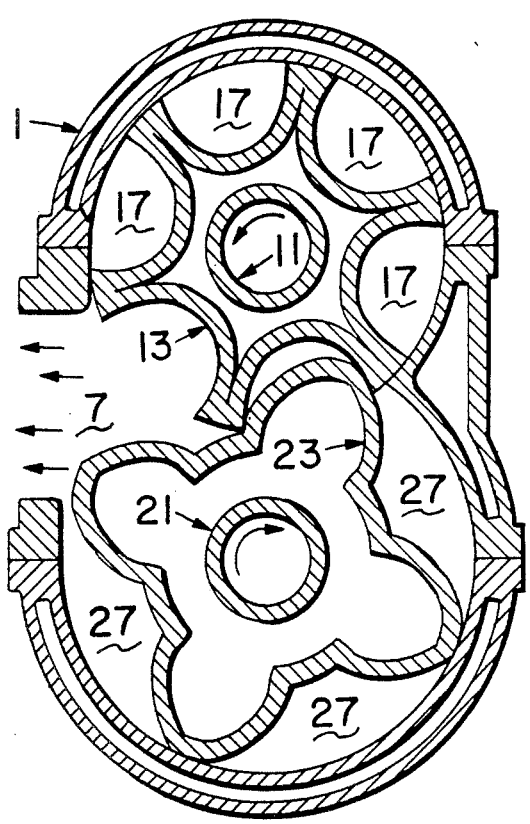
FIG. 4 is a sectional view of the rotary internal combustion engine of FIG. 2, taken along line 4—4 in FIG. 2.
Figure 5:
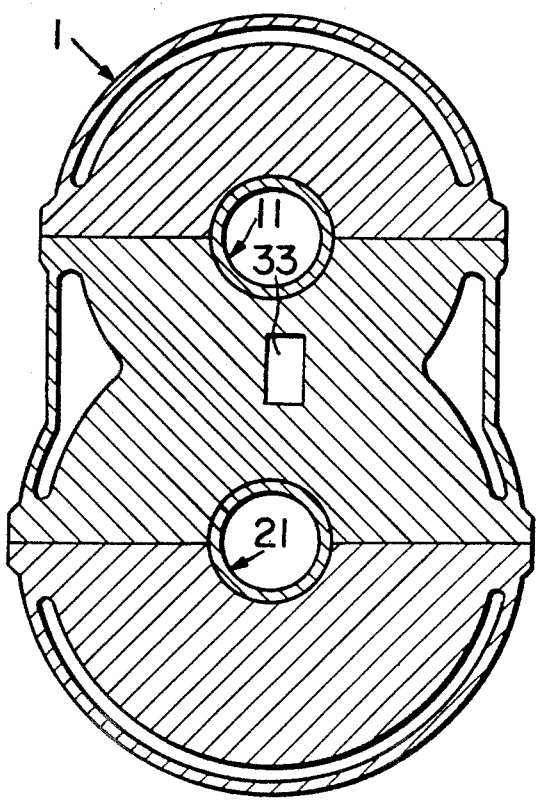
FIG. 5 is a sectional view of the rotary internal combustion engine of FIG. 2, taken along line 5—5 in FIG. 2.
Figure 8:
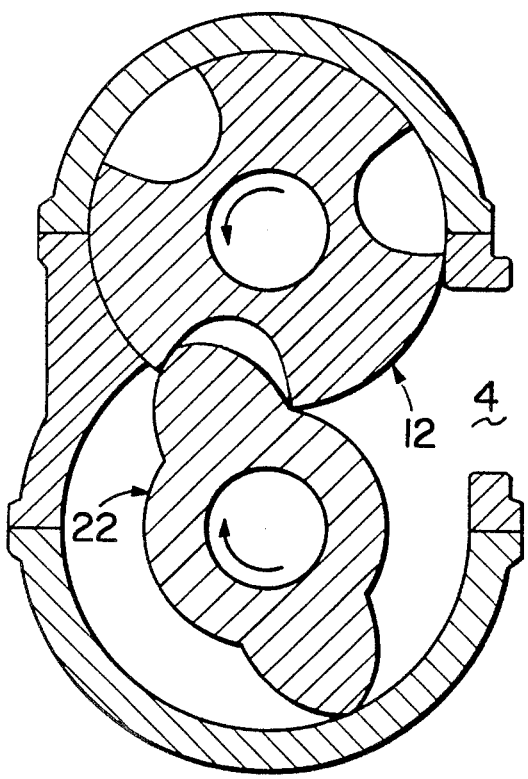
FIG. 8 is a sectional view of another form of rotors structure utilized with the invention.
Figure 9:
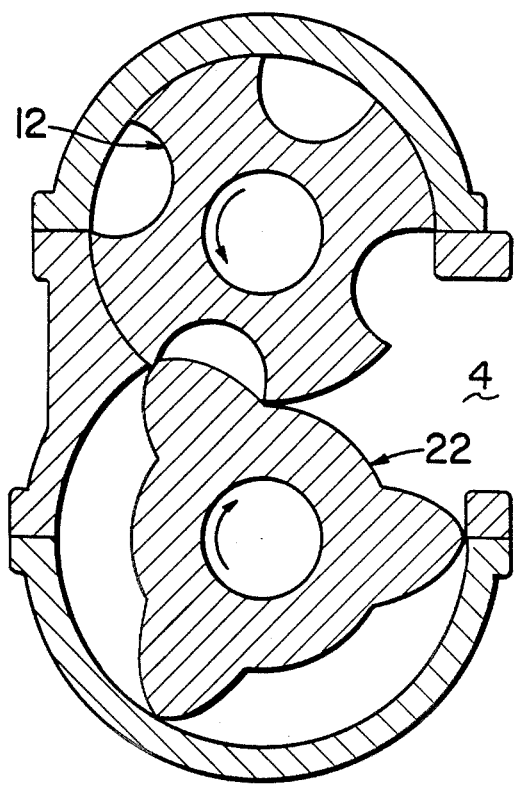
FIG. 9 is a sectional view of a further form of set of alternative compressor rotors structure according to the invention.
Figure 10:
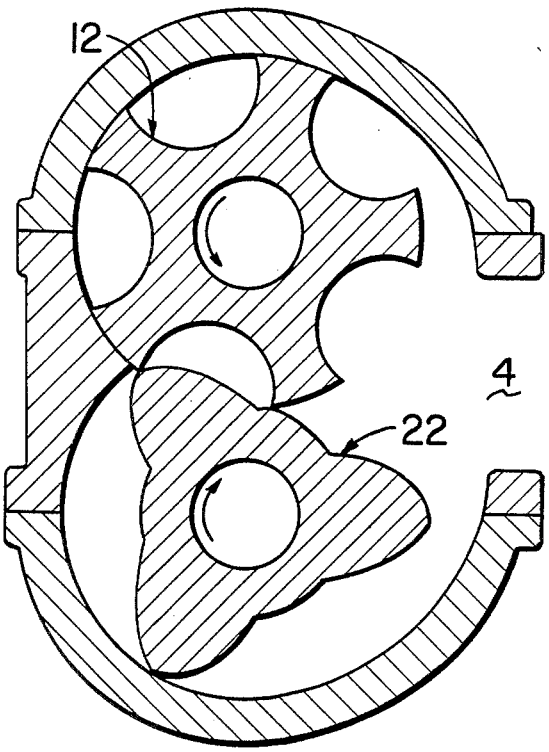
FIG. 10 is a sectional view of another form of male and female rotors structure according to the invention.
Figure 11:
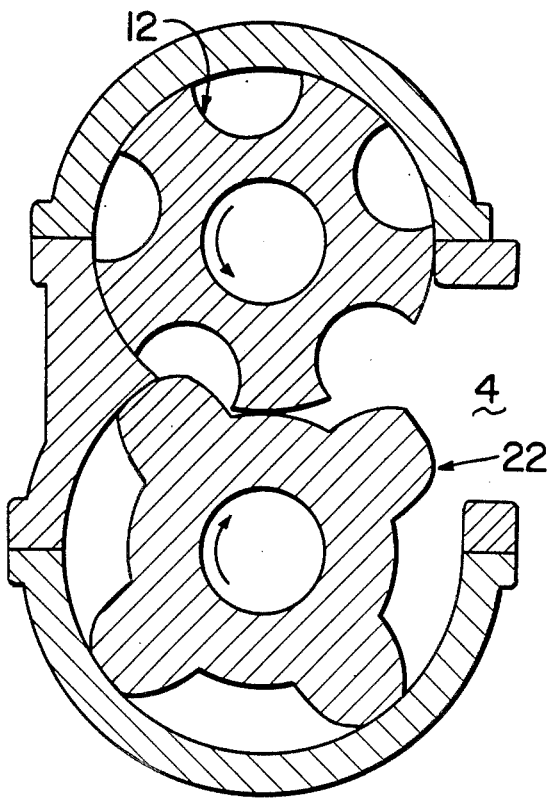
FIG. 11 is a sectional view of a further form of male and female rotors structure according to the invention.
Figure 12:
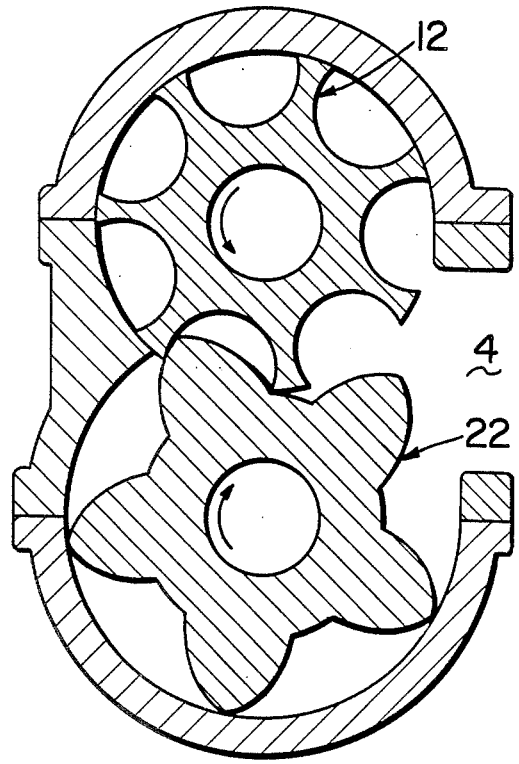
FIG. 12 is a sectional view of another form of rotors according to the invention.

In the same preferred embodiment, best shown in FIG. 3 through FIG. 5, the engine casing is provided with a water jacket, and the rotors and rotor shafts are hollow to accommodate a liquid cooling system to allow a safe engine operation at high temperature, and to minimize thermal expansion of components and leakage of combustion gases.

The operation of this engine is as follows:

Initial rotation of the compressor rotors draws in the air-fuel mixture through the intake port 4 and fills the compression chambers 16, 26 enclosed between the rotor flanks and the casing. As the rotors turn, pairs of compression chambers 16, 26 are moved toward each other, then combined into one chamber and further reduced in volume, causing compression of the air-fuel mixture. After passing the position where the tips of the two rotors meet, the merged compression chamber is delineated by the leading flank of the male rotor and that of the female rotor, its cross-section taking the shape of a crescent decreasing in size as it moves toward the center of the compressor. The asymmetric configurations of the lobes and the grooves or cavities together with different rotational speeds of the meshing rotors (the respective rotational speeds being the inverse of the ratio of the number of lobes to the number of cavities of the respective rotors) enables the reduction of the crescent cross-section to essentially a zero volume. At the end of the compression phase, when the air-fuel mixture has reached the pre-determined compression ratio, the compressor discharge port 33 located on the separation wall is uncovered by the rotating female rotor 12, the valve 31 opens and the compression chamber is placed in communication with the combustion chamber 30. With continued rotor rotation, the compressed mixture is discharged into the combustion chamber until the compression chamber volume is reduced to zero. At this point, the discharge port 33 is covered by the male rotor 22 and the valve 31 closes.

With the valves 31, 32 in closed position, the combustion chamber forms a closed chamber filled with the compressed air-fuel mixture which is then ignited and converted to high pressure gases.

On the expander side, an expansion chamber is moved to the intake port 34 by the rotating rotors 13, 23. The expander intake port 34 is uncovered by the rotating male rotor 23 and the valve 32 is turned to the open position to place the combustion chamber in communication with the expansion chamber. This allows the high pressure gases to rush into the expansion chamber, causing it to expand and to produce mechanical work by rotation of the expander rotors 13, 33.

The high pressure gas discharge from the combustion chamber is ended when the female rotor 13 covers the intake port 34 and the valve 32 closes. The combustion chamber may be scavenged by a proper timing of both compressor and expander so that the next charge of fresh mixture is introduced in the combustion chamber to force all burned gases into the expander before the intake port closes.

After the intake port 34 closes, the expansion chamber continues to expand under gas pressure until it is separated in two chambers 17, 27. The spent gases, having now expanded to atmospheric pressure, are moved to the exhaust port 7 and discharged into the atmosphere.

The preceding cycle is repeated for each pair of compression and expansion chambers resulting in 4 power strokes for one complete revolution of the male rotor with 4 lobes and 6 power strokes for one complete revolution of the female rotor with 6 grooves.

Through the foregoing description of its component parts and its method of operation, this invention defines the concept of an engine in which a rotary compressor delivers successive and separate charges of compressed air-fuel mixture to a combustion chamber where heat is added at constant volume to said charges to convert them to high pressure gases which are thereafter, transferred to a succession of expansion chambers of an expander to produce mechanical work.

While only one embodiment of this invention has been shown and described by way of illustration, many modifications of constructional detail and design may be made to the illustrated invention by presons skilled in the art without departing from the spirit and the scope of the invention as set forth in the appended claims.

I claim:

1. An internal combustion engine comprising:
a rotary compressor mechanism comprising
first and second parallel circular intersecting chambers having axially spaced end walls,
first and second rotors within said chambers, said rotors having multiple lobes with curved flank surfaces thereon in sealed rolling engagement while said lobes are within the intersected portions of the two chambers, whereby said flank surfaces trap and compress air during lobe movement through the intersected portions of the two chambers, and
a compressor discharge port defined in one of the compressor end walls and disposed in the region of an imaginary plane passing through the centers of the intersecting chambers,
means cooperating with the compressor discharge port for the discharge of gas to the combustion chamber,
a rotary expander mechanism comprising
third and fourth parallel circular intersecting chambers having axially spaced end walls,
said first chamber being in axial alignment with said third chamber, and said second chamber being in axial alignment with said fourth chamber,
a pressurized gas intake port defined in one of the expander mechanism end walls and disposed in an imaginary plane passing through the centers of the third and fourth chambers,
means cooperating with the gas intake port for the admission of pressurized gas from the combustion chamber,
third and fourth rotors within said third and fourth chambers, said third and fourth rotors having multiple lobes with curved flank surfaces thereon in sealed rolling engagement while said lobes are within the intersected portions of the associated chambers, whereby said flank surfaces are depressurized and vent the gas while delivering mechanical power to the third and fourth rotors, and
combustion chamber means disposed between the compressor mechanism and the expander mechanism,
whereby compressed air is delivered to the combustion chamber through said compressor discharge port, and pressurized gas is delivered from the combustion chamber into the expander mechanism through said pressurized gas intake port.

2. An engine according to claim 1, wherein:
the first and second compressor rotors have cross-sectional configurations which are respectively mirror images of the cross-sectional configurations of said third and fourth rotors.

3. An engine according to claim 1, and further comprising:
a common support shaft for the first and third rotors, and
a common support shaft for the second and fourth rotors.

4. An engine according to claim 3, wherein:
the first and second compressor rotors have cross-sectional configurations which are respectively mirror images of the cross-sectional configurations of said third and fourth rotors.

5. An engine according to claim 3, wherein:
the first and third rotors are female rotors having a plurality of concave flank surfaces defining a plurality of cavities of asymmetric configurations, and
the second and fourth rotors are male rotors having a plurality of convex flank surfaces defining a plurality of lobes of asymmetric configurations.

6. An engine according to claim 5, wherein:
the first and third rotors have greater numbers of lobes than the second and fourth rotors.

7. An engine according to claim 6, wherein:
the first and third rotors have six lobes thereon, and the second and fourth rotors have four lobes thereon.

8. An engine according to claim 6, wherein:
the first and third rotors have five lobes thereon, and the second and fourth rotors have three lobes thereon.

9. An engine according to claim 6, wherein:
the first and third rotors have three lobes thereon, and
the second and fourth rotors have two lobes thereon.

10. An engine according to claim 6, wherein:
the first and third rotors have four lobes thereon, and the second and fourth rotors have three lobes thereon.

11. An engine according to claim 6, wherein:
the first and third rotors have five lobes thereon, and the second and fourth rotors have four lobes thereon.
12. An engine according to claim 6, wherein:
the first and third rotors have seven lobes thereon, and
the second and fourth rotors have five lobes thereon.
13. An engine according to claim 1 wherein:
said means cooperating with the discharge port comprises a first valve associated with the compressor discharge port at one end of the combustion chamber, and
said means cooperating with the intake port comprises a second valve associated with the pressurized gas intake port at the other end of the combustion chamber.
14. An engine according to claim 13, wherein:
the valves comprise generally cylindrical valve members rotatable on their axes between open and closed positions.
15. An engine according to claim 13, wherein:
the valves comprise cylindrical valve members, each rotatable continuously about its axis.
16. An engine according to claim 13, wherein:
the valves comprise cylindrical valve members, each rotatable in alternating directions about its axis between open and closed positions.
17. An engine according to claim 1, and further including:
a cooling system comprising hollow rotors and rotor shafts for circulation of liquid coolant.
18. An engine according to claim 1, wherein:
the lobes of the first rotor and the lobes of the second rotor are so configurateted and arranged that they are in rolling interengagement at their maximum intermeshing to compress the gas in a compression chamber defined therebetween to compress the chamber volume substantially to zero volume.
19. An engine according to claim 2, wherein:
the lobes of the first rotor and the lobes of the second rotor are so configurated and arranged that they are in rolling interengagement at their maximum intermeshing to compress the gas in a compression chamber defined therebetween to compress the chamber volume substantially to zero volume.
20. An engine according to claim 5, wherein:
the lobes of the first rotor and the lobes of the second rotor are so configurated and arranged that they are in rolling interengagement at their maximum intermeshing to compress the gas in a compression chamber defined therebetween to compress the chamber volume substantially to zero volume.

* * * * *